United States Patent
Grundei et al.

[11] Patent Number: 5,971,117
[45] Date of Patent: Oct. 26, 1999

[54] PISTON-CYLINDER AGGREGATE WITH DISPLACEMENT-DEPENDENT DAMPENING FORCE FIELD

[75] Inventors: Manfred Grundei, Niederwerrn; Hans Reimer, Waigolshausen; Harald Holzapfel, Schweinfurt, all of Germany

[73] Assignee: Fichtel & Sachs AG, Schweinfurt, Germany

[21] Appl. No.: 08/851,778

[22] Filed: May 6, 1997

[30]  Foreign Application Priority Data

May 6, 1996 [DE] Germany ............................ 196 18 055

[51] Int. Cl.⁶ .................................................. F16F 9/346
[52] U.S. Cl. ..................... 188/288; 188/284; 188/322.15; 188/322.19; 267/64.15
[58] Field of Search ................................ 188/288, 322.15, 188/322.22, 284, 282.8, 282.5, 282.6, 280, 322.13, 317, 322.19, 282.1, 300, 320; 267/64.11, 124, 127, 129, 64.12, 120, 64.15; 16/66, 51, 52, 56, DIG. 9

[56]  References Cited

U.S. PATENT DOCUMENTS

| | | | |
|---|---|---|---|
| 3,024,874 | 3/1962 | Koning et al. . | |
| 3,625,321 | 12/1971 | Lutz | 188/322.15 |
| 3,853,311 | 12/1974 | Kreuzer et al. | 188/288 |
| 4,079,924 | 3/1978 | Persicke | 188/288 |
| 4,106,596 | 8/1978 | Hausmann | 188/269 |
| 4,230,309 | 10/1980 | Schnitziw | 188/288 |
| 4,595,182 | 6/1986 | Freitag et al. | 267/120 |
| 5,398,786 | 3/1995 | Mintgen | 188/284 |
| 5,477,589 | 12/1995 | Lan | 16/66 |
| 5,657,511 | 8/1997 | Lan | 16/66 |
| 5,730,263 | 3/1998 | Grundei et al. . | |
| 5,797,593 | 8/1998 | Oyaizu | 267/64.12 |
| 5,823,306 | 10/1998 | De Molina | 188/322.15 |
| 5,823,512 | 10/1998 | Oyaizu | 267/64.12 |
| 5,887,857 | 3/1999 | Perrih | 267/124 |

FOREIGN PATENT DOCUMENTS

| | | |
|---|---|---|
| 969 377 | 5/1958 | Germany . |
| 1 251 175 | 4/1968 | Germany . |
| 7 021 330 | 9/1970 | Germany . |
| 42 12 078 A 1 | 4/1982 | Germany . |
| 34 46 133 A 1 | 12/1984 | Germany . |
| 44 10 996 C 1 | 3/1994 | Germany . |

*Primary Examiner*—Douglas C. Butler
*Attorney, Agent, or Firm*—Cohen, Pontani, Lieberman, Pavane

[57]  ABSTRACT

A piston-cylinder aggregate comprising a cylinder in which an axially movable piston rod is arranged is provided. The piston rod has two pistons, which are separated from each other and which produce a damping force of a variable magnitude depending on the piston rod's stroke position. The piston-cylinder aggregate has a bypass area defined in its inner wall along a portion of the length of the cylinder, so that the damping force is at least reduced in the stroke area of the bypass, and the two pistons have a separation equal to or less than the length of the bypass, such that depending on the position of the piston rod, a damping force of variable magnitude is produced. For example, when both pistons are disposed within a section of the cylinder defined by the bypass area, the dampening force exerted by the piston rod is minimized, while when both pistons are outside the bypass area, the dampening force in both stroke directions is maximized.

4 Claims, 3 Drawing Sheets

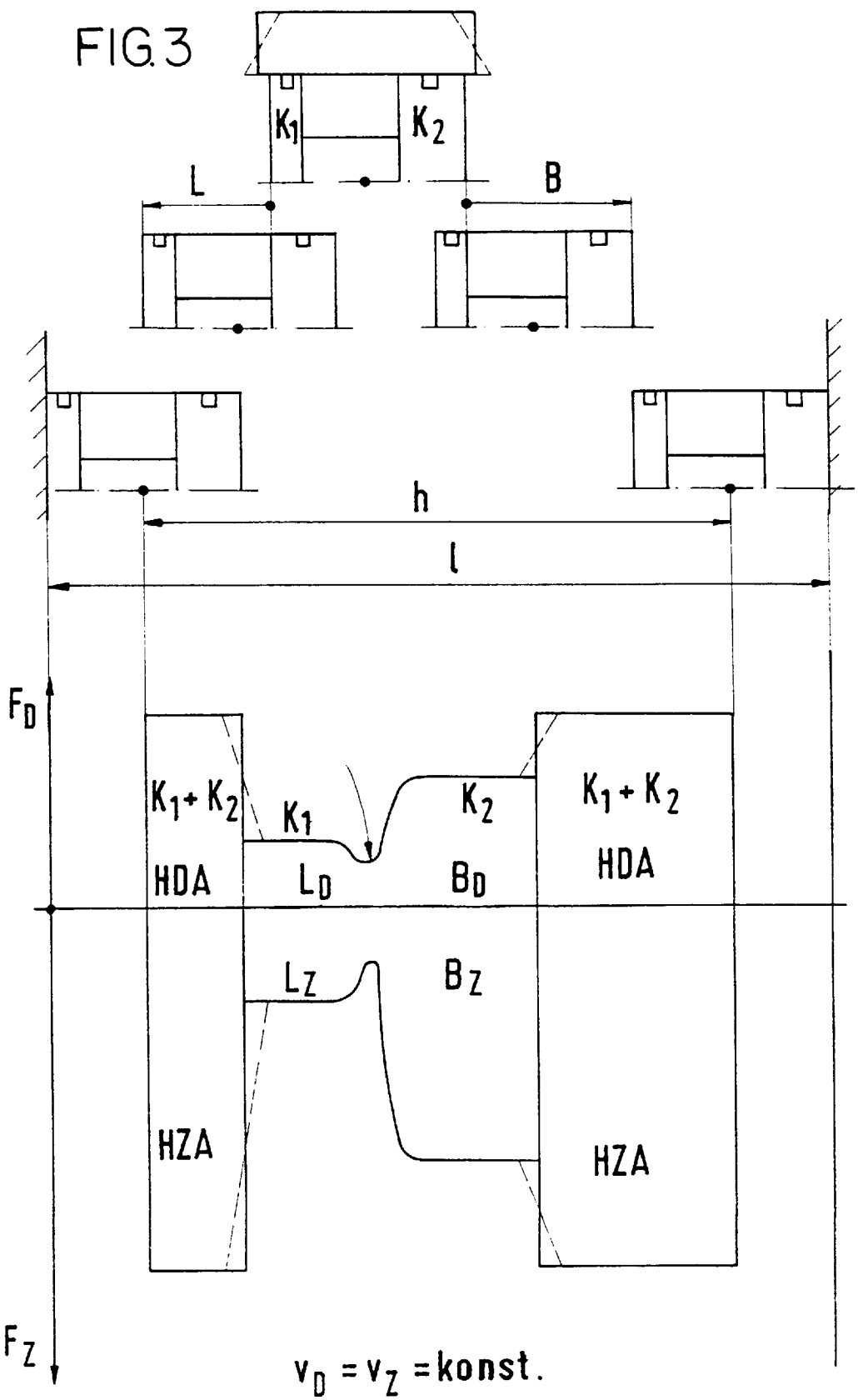

PISTON-CYLINDER AGGREGATE WITH DISPLACEMENT-DEPENDENT DAMPENING FORCE FIELD

BACKGROUND OF THE INVENTION

1. Field of the Invention

The present invention is directed to force dampening devices, and more particularly to piston-cylinder aggregate dampening devices with variable dampening force fields.

2. Description of the Related Art

Piston-cylinder based force dampening devices have many industrial applications, especially in the automotive industry. For example, a commonly-assigned German Patent Application No. DE 42 12 078 A1 discloses a piston-cylinder aggregate that is designed as an end position damper. This aggregate comprises a cylindrical pressure tube, which is axially limited on one side by a bottom and on the other side by a seal guidance unit. In addition, the piston-cylinder aggregate includes a piston system, having several piston rods and flow ducts equipped with non-return valves, that subdivides the pressure tube into two steam spaces. The aggregate has a stroke area, defined as a range of the relative positions of a piston rod with respect to the pressure tube, in which no damping force exists. Only one piston of the piston system acts in the end regions of the piston rod stroke, because each piston has a non-return valve; thus, one piston produces a damping force for one movement direction and no damping force for the other flow direction, due to the non-return valve.

Another dampening piston-cylinder aggregate is shown in German Patent No. DE PS 12 51 165 that describes a shock damper with a piston on a piston rod, in which the piston consists of two piston heads. The piston works together with a rod attached to the bottom of the shock damper. The piston rod holds the piston on its outer diameter, so that an opening can be made in the center for each piston head. These center openings act, with the rod, as chokes, and the non-return valves arranged at the piston heads ensure that no damping force is produced starting from a given end position. Furthermore, the shock damper produces no damping force in a middle stroke area, because the diameter of the rod is reduced over a defined length, permitting the center openings to produce practically no damping forces. However, the damping force is produced only by the present cross-section resulting from coverage of a center opening by the rod. The piston heads, because of their non-return valves, do not participate in the damping force effect.

Yet another dampening device is shown in a commonly assigned German Patent Application No. DE 34 46 133 that discloses a vibration damper with variable damping force, in which a bypass in a damping valve device can be activated by an adjustment device in such a manner that at a given time either one of the damping valve systems in the damping valve device is producing a damping force or both damping valve systems are active.

However, none of the above or other load dampening devices provide a load-dependent dampening force which adjusts automatically to compensate for an increased load magnitude without external intervention. It would thus be desirable to provide a load dampening device for providing a dampening force of a magnitude dependent on the magnitude of the load being exerted on the device.

SUMMARY OF THE INVENTION

In accordance with the present invention, a piston-cylinder aggregate comprising a cylinder in which an axially movable piston rod is arranged is provided. The piston rod has two pistons, which are separated from each other and which produce a damping force of a variable magnitude depending on the piston rod's stroke position. The piston-cylinder aggregate has at least one bypass area defined in its inner wall along a portion of the length of the cylinder, so that the damping force is at least reduced in the stroke area of the bypass, and the two pistons have a separation less than the length of the bypass, such that depending on the position of the piston rod, a damping force of variable magnitude is produced. For example, when both pistons are disposed within a section of the cylinder defined by the bypass area, the dampening force exerted by the piston rod is minimized, while when both pistons are outside the bypass area, the dampening force in both stroke directions is maximized. Thus, damping force provided by the aggregate is automatically adjusted as required depending on the stroke position or compression distance, without the use of complicated adjustment means.

Both pistons are equipped with damping valves for both flow directions. In accordance with the present invention, the particular design of the damping valves may be varied to achieve damping force characteristics that are more or less strongly asymmetrical.

The bypass consist of at least one bead with a substantially axial orientation defined in the inner wall of the cylinder tube. This type of bypass can be formed relatively easily and with sufficient precision. Preferably, the cross-section of the bead is transitionally gradated in both of its ends. This gradation of the bypass cross-section, in conjunction with use of varying types of damping valves, permits great variability with respect to the desired damping force field.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote elements throughout the several views:

FIG. 2b is a cross-section of FIG. 2a;

FIG. 3 is a graph of a damping force field exerted by the piston-cylinder aggregate of FIG. 1 as a function of displacement.

DETAILED DESCRIPTION OF THE PRESENTLY PREFERRED EMBODIMENTS

While only a single piston-cylinder aggregate is described below, it should be understood that multiple piston-cylinder aggregates may be readily used in multiple numbers to provide a self-adjusting dampening force field. Furthermore, the piston-cylinder aggregate of the present invention is described below in an exemplary embodiment of a single tube vibration damper. It should also be understood that the aggregate of the present invention may be readily adapted to other force dampening applications without departing from the spirit of the invention.

Figure 1:
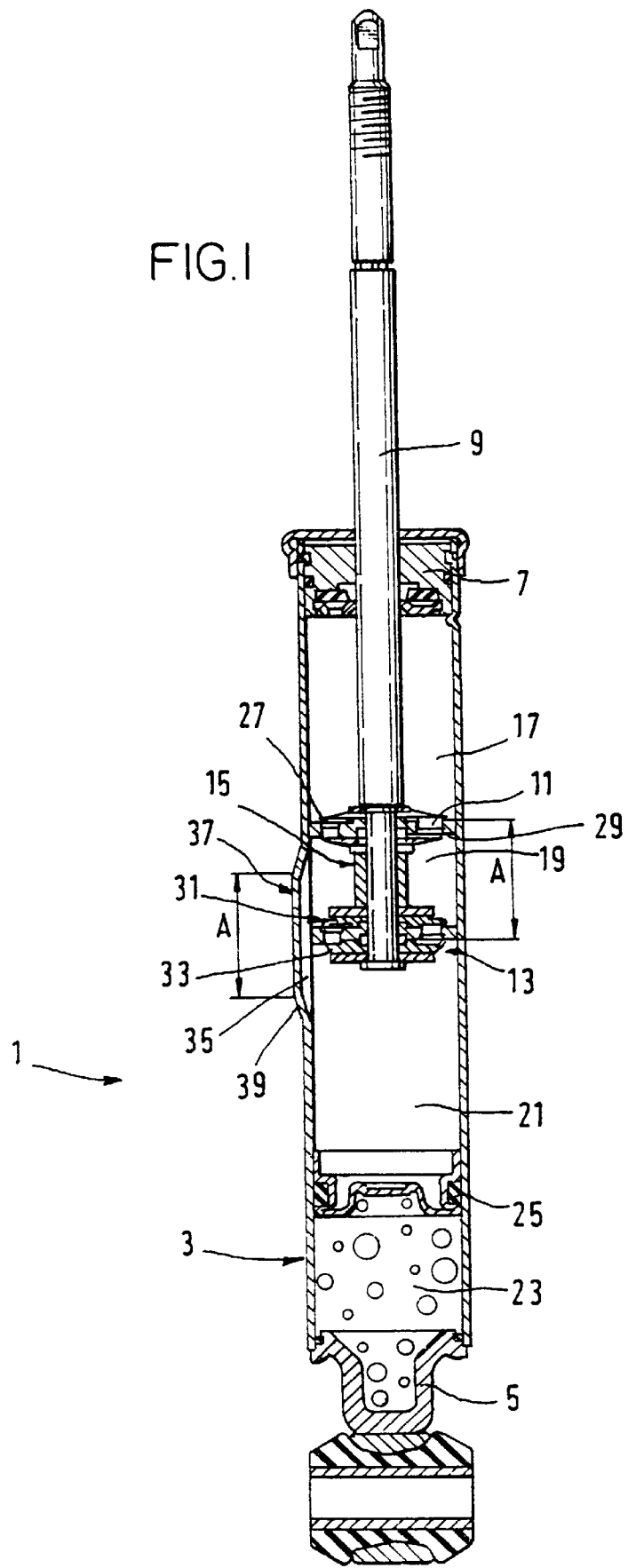
FIG. 1 is a longitudinal section view of the piston-cylinder aggregate of the present invention.
Figure 2B:
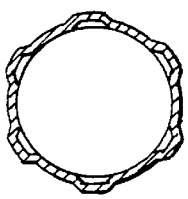
Figure 2A:
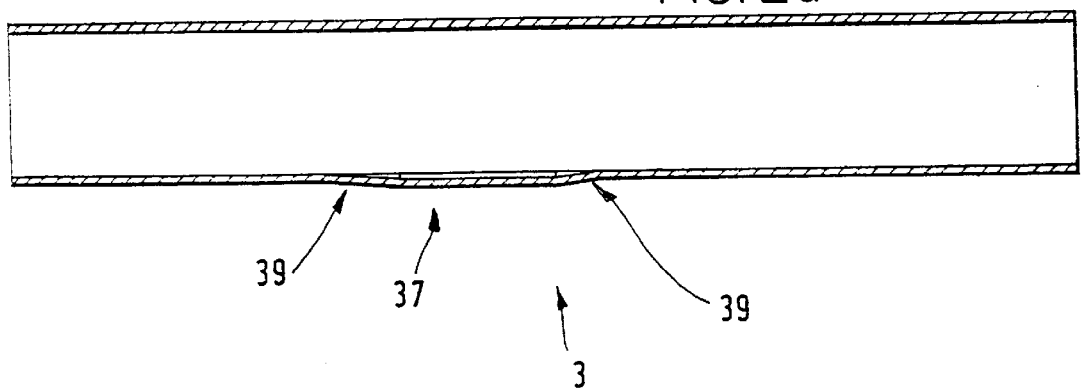
FIG. 2a is a longitudinal section view of the cylinder portion of the piston-cylinder aggregate of FIG. 1 as an individual part.
Figure 2C:
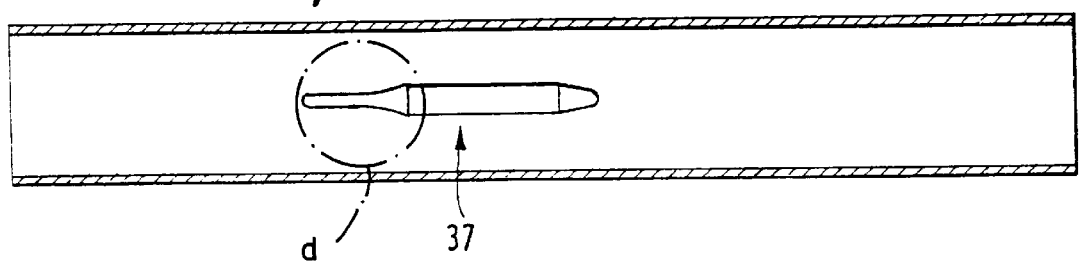
FIG. 2c is a view similar to FIG. 2a with the cylinder rotated 90° about its longitudinal axis.
Figure 2D:
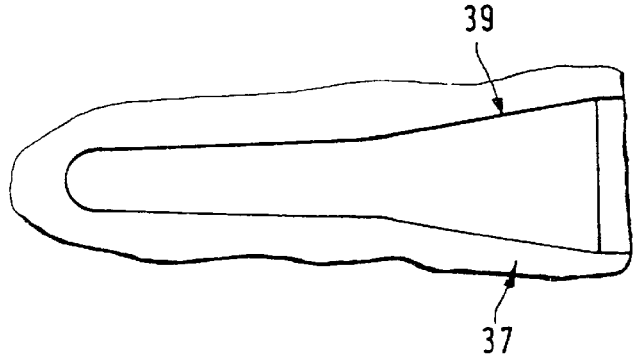
FIG. 2d is an enlarged view of region d in FIG. 2c.

Referring initially to FIG. 1, a piston-cylinder aggregate 1 is shown that is designed as a single-tube vibration damper. The piston-cylinder aggregate includes a cylinder 3, which is sealed off from its surroundings by a bottom 5 at one end and a piston rod guide 7 at the other end. Inside the cylinder 3 is a piston rod 9 with a first piston 11 and a second piston 13. The two pistons 11, 13 are kept at a distance "A" from each other by a sleeve 15, creating three steam spaces 17, 19, and 21. The size of the two steam spaces 17, 21 depends on the current stroke position of the piston rod 9, while the steam space 19 between the pistons 11, 13 has a constant volume. Extending from the bottom 5 is a gas-filled compensating space 23, which is separated from the steam space 21 by a separating piston 25.

Each of the pistons 11, 13 is equipped on both sides with damping valves 27, 29 and 31, 33 respectively. This allows the pistons 11, 13 to produce a damping force in both flow directions. With respect to the specific embodiment of the pistons and the damping valves, the commonly assigned German Patent No. DE 44 10 996 C1 is hereby incorporated by reference in its entirety. To produce a damping force dependent on the stroke position or displacement, the piston-cylinder aggregate 1 has at least one bypass 35, which is formed by at least one bead 37 that runs substantially in the axial direction.

Referring now to FIGS. 2a–2d several views and details of the cylinder 3 as an individual part are shown. As FIGS. 2a–2d clearly shows, the bead 37 is embodied in a gradated manner in dependence on the stroke position. Although the following description describes a single bead, a plurality of beads of this design is also contemplated. To avoid damping force shocks, the bead 37 may include transition cross-sections 39. The transition cross-sections 39 are preferably formed by a beveled contour of at least one bead edge.

Referring now to FIG. 3 the relationship between the position of the piston relative to the bypass and the displacement-dependent damping force is illustrated. Preferably, the bypass area is longer than the distance between the two pistons 11, 13 or between their piston seals. Thus, if both pistons are located inside the bypass area of the cylinder, then only a minimal damping force of the piston-cylinder aggregate exists, because the damping medium can be exchanged between the steam spaces 17 and 21 without having to flow through the damping valves. However, in any case, a comfortable damping force setting is obtained, with this point corresponding, for example, to a stroke position of the piston rod at a normal or reduced vehicle load.

If the piston rod moves in one of the two directions $F_D$ (equal damping force in pressure direction) or $F_z$, then only the piston located outside of the bypass is effective. The damping valves 29, 33 are designed to be more pronounced in their damping force effects $L_z$ and $B_z$ than are the damping valves 27, 31 with the damping forces $L_D$ and $B_D$. This is done because a stronger damping effect at a greater load has, for example, an advantageous influence on the driving safety of the vehicle. This relationship is illustrated by the vertical extension of the damping force areas in the damping force characteristic field in FIG. 3.

If both pistons 11, 13 are located outside of the bypass area, then the active damping forces of the pistons are superimposed on one another at the hydraulic pressure stops HDA and HZA relative to the pull and pressure directions, respectively, since the pistons are also arranged hydraulically in series. The damping medium must flow in the direction of pressure, for example, from the steam space 21 via the damping valve 31 to the steam space 19 and from there via the damping valve 27 to the steam space 17.

As the damping force characteristic field shows, no jumps in damping force need occur between the individual damping force characteristic fields as long as the bypass has suitably adjusted transition cross-sections, such as transitional cross sections 39 of the bead 37. The influence of the transition cross-sections is indicated by the dashed lines in FIG. 3.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A device for producing a load-dependent damping force for a load of a particular magnitude exerted thereon, the device comprising:

a hollow substantially cylindrical housing having a top end and a bottom end, and having a longitudinal central axis, said housing comprising an upper axial section proximal to said top end, a lower axial section proximal to said bottom end, and a central axial section of a predefined length substantially centrally defined between said upper and lower sections;

at least one hollow bypass area of said predefined length defined along an inner wall of said housing and along said central axis in said central section, said hollow bypass area having a length; and an axially displaceable piston rod having a proximal end and a distal end disposed within said housing, said proximal end of said piston rod extending outward through said top end of said housing, said piston rod comprising a first piston and a second piston, said first piston being positioned substantially at said distal end of said piston rod, and said second piston being positioned at a predefined distance from said first piston along said piston rod, said predefined distance being less than said length of said hollow bypass area, wherein when the load is exerted axially on the device, said piston rod is movable between a first position when both said first and second pistons are disposed within said central section along said bypass such that the device provides a dampening force of a first magnitude, a second position when one of said first and second pistons outside said central section such that the device provides a dampening force of a second magnitude that is higher than said first magnitude, and a third position when both said first and second pistons are disposed outside said central section such that the device provides a dampening force of a third magnitude that is higher than said second magnitude, such that the position of said piston rod corresponds to the magnitude of the load on the device, wherein said piston rod provides a lowest dampening force at said first position and a highest dampening force at said third position, each of said first and second pistons further comprising a separate damping valve for each flow direction, said damping valves being arranged so that they cannot be bypassed when outside the bypass area.

2. The device of claim 1, wherein said at least one bypass area comprises an elongated bead having a first end and a second end.

3. The device of claim 2, wherein said elongated bead comprises a gradational section disposed at at least one of said first end and second end.

4. The device of claim 3, wherein each said gradation section comprises a beveled contour.

\* \* \* \* \*